United States Patent [19]

Sigmund

[11] Patent Number: 4,519,736
[45] Date of Patent: May 28, 1985

[54] PIN TYPE FASTENER USABLE WITH SWAGE COLLAR TO FORM A JOINT

[76] Inventor: Jerry A. Sigmund, 19 Rock Hill Rd., Bala Cynwyd, Pa. 19004

[21] Appl. No.: 376,226

[22] Filed: May 7, 1982

[51] Int. Cl.³ .................. F16B 19/05; F16B 39/30
[52] U.S. Cl. ................................. 411/361; 411/411
[58] Field of Search ............... 411/403, 404, 405, 406, 411/407, 408, 409, 410, 411, 412, 413, 414, 309, 423, 308, 310, 311, 361, 510

[56] References Cited

U.S. PATENT DOCUMENTS

| | | | |
|---|---|---|---|
| Re. 30,445 | 12/1980 | Ruhl | 411/361 |
| 3,481,178 | 12/1969 | Wilkins | 411/411 X |
| 3,738,217 | 6/1973 | Walker | 411/510 |
| 3,861,269 | 1/1975 | Laverty | 411/413 |
| 3,915,052 | 10/1975 | Ruhl | 411/361 |
| 4,171,012 | 10/1979 | Holmes | 411/405 X |
| 4,233,879 | 11/1980 | Sigmund | 411/361 |
| 4,342,529 | 8/1982 | Smith | 411/361 |

FOREIGN PATENT DOCUMENTS 1455810 11/1976 United Kingdom ............... 411/411

Primary Examiner—Thomas J. Holko
Assistant Examiner—Rodney M. Lindsey
Attorney, Agent, or Firm—R. P. Seitter

[57] ABSTRACT

A fastener in accordance with this invention is a pin member usable with a collar to fasten a joint. The pin member comprises a head and an integrally formed shank extending therefrom. The shank includes a locking portion formed with a plurality of ribs separated from each other by locking grooves, the depth of which are all substantially equal to each other. At least one of the ribs is formed with a portion symmetrical about a line extending at a right angle to the axis of the shank and a portion asymmetrical about that line. Preferably all of the ribs have a radiused crest.

17 Claims, 4 Drawing Figures

PIN TYPE FASTENER USABLE WITH SWAGE COLLAR TO FORM A JOINT

BACKGROUND OF THE INVENTION

This invention relates generally to fasteners and, more particularly, to pin type fasteners used with a collar to fasten a plurality of workpieces together.

Pin members of this type generally include a head and a shank formed with a plurality of ribs. The shank is inserted through aligned holes in the workpieces to be secured so that a bearing surface on the head abuts the outer surface of an outermost workpiece and so that the ribs formed on the shank extend beyond the outer surface of the other outermost workpiece. The collar, generally formed with a smooth bore, is placed over the shank and is swaged so that collar material flows into locking grooves formed between the ribs. The swaging is generally done while the shank of the pin member is held in tension. This tension is reacted at the bearing surface of the pin head as force is applied to the outer surface of the collar.

In conventional fasteners of this type, most of the axial load is carried by the rib and swaged collar material closest to the workpiece so that most failures occur there. Attempts to more evenly distribute the load among the ribs and the swaged collar material between them include the use of different rib configurations on the shank so that the locking grooves closest to the free end thereof are deeper in the radial direction than those closest to the head. See, for example, my prior U.S. Pat. No. 4,233,879; U.S. Pat. No. 3,915,053 issued to Ruhl; and U.S. Pat. No. 2,396,661 issued to Keller et al.

Because of the reduced diameter of the shank adjacent the deeper locking grooves the tensile strength of the fastener systems disclosed in the noted patents is limited. This means that the fasteners must be larger and, of course, weigh more than would be necessary if the load distribution advantages could be obtained without so reducing the diameter of the shank. The advantages obtainable from size and weight reduction make it highly desirable and, thus, an object of this invention is to provide a pin member usable with a swage collar that provides these advantages.

This problem is of even more significance where the pin member is tensioned during installation by pulling on a pintail formed as part of the shank. This pintail is connected to a locking portion, that portion formed with the ribs, by a breakneck. This breakneck is a groove formed in the shank to reduce the cross-sectional area, and, thus, the tensile strength thereof so that the pintail is broken off at a predetermined tensile load during installation. Obviously, the breakneck must be weaker than the weakest locking groove so that the breakneck fails instead of the locking groove. This causes a reduction in the installation loads that can be used and makes the use of high strength collar materials, for example, materials such as titanium or alloys of titanium and certain aluminum alloys having a strength exceeding 40% of the pin material, impractical. In order for such collar materials to flow into the locking grooves, higher installation loads are not practically achieved with reduced breakneck grooves. It is thus an object of this invention to provide a pin member usable with a collar made of high strength material.

It is yet another object of this invention to provide a pin member that provides easy flow of a high strength collar material during installation and which doesn't compromise the shear strength of the ribs or the cross-sectional area of the shank in the locking section. In contrast, merely increasing the strength of the collar material in prior art systems would shift the mode of failure in tension from shearing the collar material at the rib major diameter to shearing the pin at the rib minor diameter or failing the pin in the cross-sectional area of the shank in the locking section. In this way full advantage of the high strength collar material is realized.

It is yet another object of this invention to eliminate high bending stresses on the ribs as the collar material is swaged into the locking grooves.

Finally, it is an object of this invention to provide ribs toward the point end of the pin with sufficiently high shear strength to withstand additional loads felt by these ribs as high strength collar material is swaged into these grooves during installation.

SUMMARY OF THE INVENTION

A fastener in accordance with this invention is a pin member adapted to be used with a collar to fasten a joint. The pin member comprises a head and a shank extending therefrom. The shank includes a locking portion formed with a plurality of ribs separated from each other by locking grooves, the depth of which may be substantially equal to each other. At least one of the ribs is formed with a portion symmetrical about a line extending at a right angle to the axis of the shank and a portion asymmetrical about this line.

DETAILED DESCRIPTION OF A PREFERRED EMBODIMENT

Figure 1:
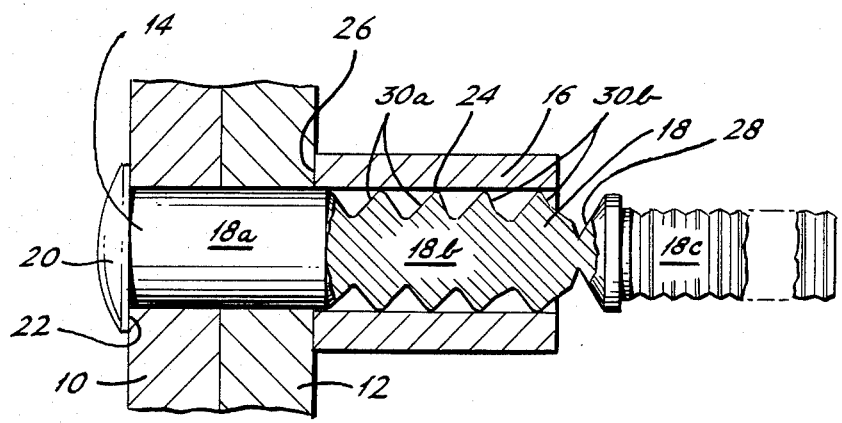
FIG. 1 is a cross-sectional view of a joint to be secured with a swage collar and a pin member in accordance with this invention.

In FIG. 1 there is illustrated a joint comprising a pair of workpieces 10 and 12 which are to be secured together by a pin member 14 and a collar 16. The workpieces 10 and 12 are formed with aligned openings in which are received the shank 18 of the pin member. At one end, the shank 18 is integrally formed with a head 20 of any suitable configuration so long as it includes a bearing surface 22 which bears on the outer surface of the workpiece 10. The shank 18 extends beyond the outer surface of the workpiece 12 and terminates at what is generally referred to as the point end. The collar 16, as seen in FIG. 1, is formed with a generally smooth axially extending bore 24 and a bearing surface 26 which bears on the outer surface of the workpiece 12.

Figure 2:
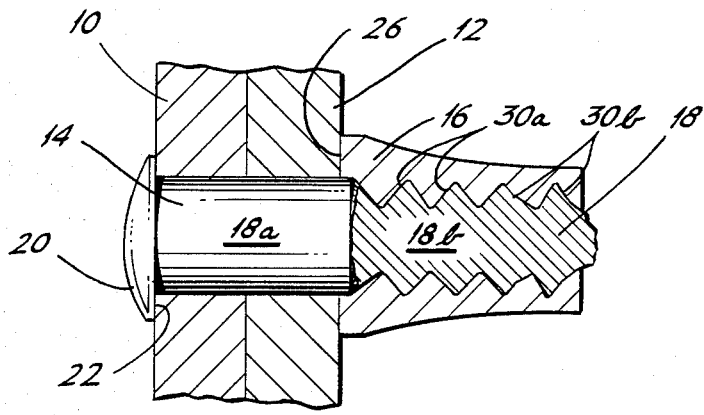
FIG. 2 is a cross-sectional view similar to FIG. 1 showing the secured joint.

The shank 18 is formed with a smooth surface or grip portion 18a having an axial length generally equal to or slightly longer than the thickness of the workpieces 10 and 12, a ribbed locking portion 18b extending beyond the workpieces and a pintail portion 18c connected to the locking portion by a groove 28 commonly referred to as a breakneck. After the collar 16 is in place as shown in FIG. 1, a tool is applied to the pintail portion 18c and pulls on it to apply a tensile load that pulls the workpieces 10 and 12 together with the bearing surfaces 22 and 26 in place against the workpieces 10 and 12, respectively. The tool then engages the outside of the collar 16 from adjacent the end nearest the pintail 18c and exerts radially inward force and axial force on the collar. This swages the collar forcing the collar material to flow into the locking grooves formed between the ribs on the locking portion 18b as shown in FIG. 2 of the drawing. After the collar is thus swaged, the tensile load applied by the tool increases to a level that breaks off the pintail portion 18c at the breakneck 28. Such tools are generally conventional and well known in the art.

In accordance with this invention, the ribs and locking grooves formed in the locking portion 18b are formed to distribute the axial load in the fastener assembly. There are two groups of ribs shown as 30a and 30b. The ribs in one group differ in configuration from the ribs in the other group; however, it is important to note that all the ribs have a major and minor diameter and that all major diameters are substantially equal and all minor diameters are substantially equal. Thus, the depth of the locking grooves are substantially equal. Thus, the ultimate tensile strength of the shank adjacent the locking grooves is not compromised by having deeper grooves adjacent the point end.

Figure 3:
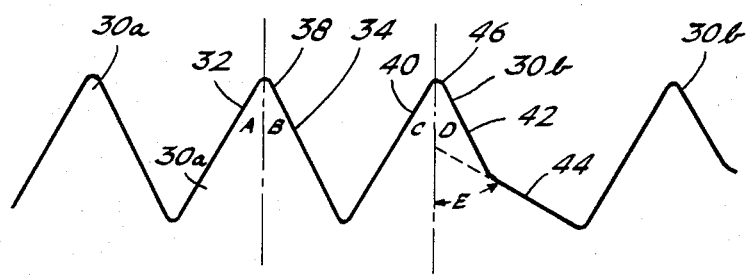
FIG. 3 is an enlarged cross-sectional view of rib and locking groove configuration in accordance with this invention; and, FIG. 4 is an enlarged cross-sectional view of another rib and locking groove configuration in accordance with this invention.

In the preferred embodiment disclosed herein there are two ribs 30a and two ribs 30b, but it should be understood that their number may vary. It is not necessary that the number of ribs 30a equal the number of ribs 30b. The ribs 30a are closer to the head 20 and are generally symmetrical when viewed in longitudinal cross-section as shown in FIG. 3. Each rib 30a includes a load bearing flank 32 and a non-load bearing flank 34 with the load bearing flank being closer to the head 20 and the non-load bearing flank being closer to the breakneck 28. These flanks 32 and 34 are joined at the major diameter by a relatively sharp radiused crest 38. The radius is such that the crest 38 is sharp enough to cause high strength collar material such as titanium or certain aluminum alloys to flow into the locking grooves during installation. The flanks 32 and 34 form an angle A and B, respectively, with a line drawn through the crest 38 at a right angle to the axis of the shank 18. Being symmetrical, the angle A is substantially equal to angle B. By "substantially equal" is meant that the angles A and B are theoretically equal, but that normal manufacturing tolerances may result in their not being exactly equal.

The ribs 30b are closer to the breakneck 28 and include generally symmetrical and asymmetrical portions when viewed in longitudinal cross-section. Each rib 30b includes a load bearing flank 40 closer to the head 20 and a non-load bearing flank comprised of surfaces 42 and 44 closer to the breakneck 28. The flank 40 and flank surface 42 are joined at the major diameter by a relatively sharp radiused crest 46 similar to the crest 38 to cause high strength collar material to flow into the locking grooves. The flank 40 and flank surface 42 form an angle C and D, respectively, with a line drawn through the crest 46 at a right angle to the axis of the shank 18. The angles C and D are substantially equal and, thus, the flank surface 42 and the adjacent portion of flank 40 form the symmetrical portion of the rib 30b extending inwardly from the crest 46. Preferably angles C and D equal angles A and B.

The flank surface 44 is discontinuous with the surface 42 and forms an angle E with the line drawn through the crest 46 and the axis of the shank 18 as illustrated by the dotted line extension of the surface 44 shown in FIG. 3. The angle E is larger than the angles C and D and, thus, the flank surface 44 with the adjacent portion of load bearing flank 40 forms the asymmetrical portion of the rib 30b and this portion extends inwardly from the intersection with the symmetrical portion to the minor diameter. It is believed that angle E should be at least about five degrees larger than the angles C and D in order to obtain the functional advantages of this invention. It is also believed that the intersection of the flank surfaces 42 and 44 should be about midway between the major and minor diameters of the rib 30b, but this is variable depending on various design criteria. It should be understood that the axial distance between ribs 30b is greater than that between ribs 30a.

Use of the symmetrical portion adjacent the crests provides for the elimination of bending stress on the ribs as they force the collar material to flow. In addition, contact stresses between the collar material and the rib are increased for the same depth of penetration as compared to a non-symmetrical configuration. This causes the collar material to flow more readily.

With the rib configurations described above, the disadvantages of the prior art are overcome and the objects of this invention are achieved. Another rib configuration providing these results is disclosed in FIG. 4. In this configuration the ribs 30b are the same as disclosed in FIG. 3 and need not be described again. It is noted that the same reference numerals are used in FIG. 3 to denote similar parts. However, ribs 30a have been replaced by ribs 30c which include symmetrical and asymmetrical portions. Each rib 30c includes a load bearing flank 48 closer to the head 20 and a non-load bearing flank comprised of surfaces 50 and 52 closer to the breakneck 28. The flank 48 and flank surface 50 are joined at the major diameter by a relatively sharp radiused crest 54 similar to that of crests 38 and 46. The flank 48 and flank surface 50 form angles F and G, respectively, with a line drawn through the crest 54 at a right angle to the axis of the shank. The angles F and G are substantially equal to each other and also to the angles C and D. Accordingly, the flank surface 50 and the adjacent portion of the flank 48 form the symmetrical portion of the rib 30c. This portion extends inwardly from the crest 54.

Figure 4:
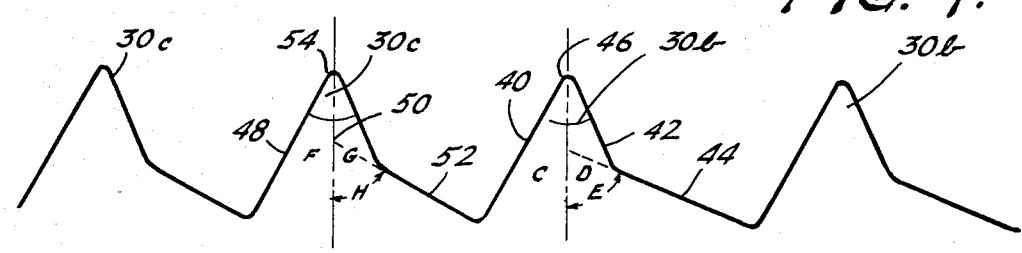

The flank surface 52 is discontinuous with the flank surface 50 and forms an angle H with the line drawn through the crest 54 and the axis of the shank 18 as illustrated by the dotted line extension of the surface 52 shown in FIG. 4. The angle H is larger, preferably by at least about five degrees, than the angles F and G so that the flank surface 52 with the adjacent portion of the flank 48 forms the asymmetrical portion of the rib 30c.

The flank surface 44 forms a greater angle with the line through the crest 46 than the flank surface 52 forms with crest 54. That is, angle E is greater than angle H. It is believed that the angle E should be at least about five degrees larger than angle H. Similar to the FIG. 3 embodiment, the axial distance between ribs 30b is greater than that between ribs 30c.

While in the foregoing there has been described several embodiments of the invention, it should be understood that various changes and modifications could be made without departing from its scope as recited in the claims.

I claim:

1. A pin member adapted to be used with a collar for fastening a joint, said pin member comprising a head and a shank extending therefrom, said shank including a locking portion formed with a plurality of ribs separated from each other by locking grooves, the major diameter of said ribs being substantially equal, at least one of said ribs being formed with a portion symmetrical about a line extending at a right angle to the axis of said shank and a portion asymmetrical about said line, said one rib including a load bearing flank and a non-load bearing flank, said flanks being joined by a radiused crest through which said line extends.

2. A pin member in accordance with claim 1 wherein said load bearing flank forms a first angle with said line and wherein said non load bearing flank includes a first flank surface forming a second angle with said line which angle is substantially equal to said first angle, said non load bearing flank including a second flank surface forming a third angle with said line, said third angle being greater than said first angle.

3. A pin member in accordance with claim 2 wherein said third angle is at least about five degrees larger than said first angle.

4. A pin member in accordance with claim 1 wherein said symmetrical portion is formed by one portion of said load bearing flank and one portion of said non load bearing flank extending inwardly from said crest and wherein said asymmetrical portion is formed by another portion of said load bearing flank inwardly adjacent said one portion thereof and another portion of said non load bearing flank inwardly adjacent said one portion thereof.

5. A pin member in accordance with claim 1 wherein said load bearing flank is a continuous surface and said non load bearing flank is formed of two surfaces intersecting each other approximately midway between the major and minor diameter of said rib.

6. A pin member in accordance with claim 1 wherein said shank includes a pintail portion integrally joined to said locking portion by a breakneck.

7. A pin member in accordance with claim 1 wherein all of said ribs include symmetrical portions adjacent their crests.

8. A pin member adapted to be used with a collar for fastening a joint, said pin member comprising a head and a shank extending therefrom, said shank including a locking portion formed with a first group of ribs adjacent said head and a second group of ribs adjacent the point end, all of said ribs including a major diameter and a minor diameter, all of said major diameters being substantially equal and all of said minor diameters being substantially equal, each rib in a group being of substantially the same configuration, each rib in said second group being formed with a substantially continuous load bearing flank and a discontinuous non load bearing flank, all of said flanks being joined by a radiused crest and form symmetrical portions adjacent their crests.

9. A pin member in accordance with claim 8 wherein each rib in said first group is formed with substantially continuous load and non load bearing flanks.

10. A pin member in accordance with claim 8 wherein each rib in said first group is formed with a substantially continuous load bearing flank and a substantially discontinuous non load bearing flank.

11. A pin member in accordance with claim 8 including a pintail connected to said shank by a breakneck.

12. A pin member in accordance with claim 10 wherein each non load bearing flank includes a first surface portion forming a first angle with a line extending at a right angle to the axis of said shank and second surface portion forming a second angle with said line, said second angles in said ribs of said second group being larger than said second angles in said ribs of said first group.

13. A pin member in accordance with claims 8 or 12 wherein the spacing between the ribs in the second group is larger than the spacing between ribs in the first group.

14. A joint comprising a plurality of workpieces in mating relationship, said workpieces including aligned openings; a pin member including a head including a bearing surface in bearing engagment with an outer surface of one of said workpieces and a shank extending from said head and through said aligned openings, said shank including a locking portion extending beyond the outer surface of another of said workpieces; and, a collar extending around said locking portion and including a bearing surface in bearing engagment with the outer surface of said another of said workpieces; said collar material having a strength equal to at least 40% of the pin material; said locking portion of said shank being formed with a plurality of ribs separated from each other by locking grooves having a substantially equal depth, said locking grooves being filled with collar material, said ribs being arranged in a first group adjacent said head and a second group adjacent the point end of said shank, said ribs in each of said first and second groups being substantially similar to the other ribs in said group and the ribs in said first group being different from the ribs in the other group whereby the tensile load in said pin member is distributed among said ribs and said locking grooves such that failure does not occur in the first or second locking groove adjacent the head.

15. A joint in accordance with claim 14 wherein all of said ribs include a crest formed at their major diameters, all of said ribs being symmetrical for a portion extending inwardly from said crest and at least some of said ribs including an asymmetrical portion extending inwardly from said symmetrical portion.

16. A joint in accordance with claim 15 wherein said crests are radiused.

17. A pin member adapted to be used with a collar for fastening a joint, said pin member comprising a head and a shank extending therefrom, said shank including a locking portion formed with a plurality of ribs separated from each other by locking grooves, the major diameter of said ribs being substantially equal, at least one of said ribs being formed with a portion symmetrical about a line extending at a right angle to the axis of said shank and a portion asymmetrical about said line, said one rib including a load bearing flank and a non-load bearing flank, said flanks being joined by a crest through which said line extends, said shank including a pintail portion integrally joined to said locking portion by a breakneck.

* * * * *